United States Patent [19]

Boudreau et al.

[11] Patent Number: 4,559,595
[45] Date of Patent: Dec. 17, 1985

[54] DISTRIBUTED PRIORITY NETWORK LOGIC FOR ALLOWING A LOW PRIORITY UNIT TO RESIDE IN A HIGH PRIORITY POSITION

[75] Inventors: Daniel A. Boudreau; Edward R. Salas, both of Billerica; James M. Sandini, Berlin, all of Mass.

[73] Assignee: Honeywell Information Systems Inc., Waltham, Mass.

[21] Appl. No.: 453,406

[22] Filed: Dec. 27, 1982

[51] Int. Cl.[4] .......................... G06F 9/46; G06F 15/16
[52] U.S. Cl. ......................................... 364/200; 370/85
[58] Field of Search ............................................ 370/85; 364/200 MS File, 900 MS File

[56] References Cited

U.S. PATENT DOCUMENTS

| | | | |
|---|---|---|---|
| 4,030,075 | 6/1977 | Barlow | 340/172.5 |
| 4,096,569 | 6/1978 | Barlow | 364/200 |
| 4,236,203 | 11/1980 | Curley et al. | 364/200 |
| 4,385,350 | 5/1983 | Hansen . | |
| 4,451,881 | 5/1984 | Grice . | |
| 4,467,418 | 8/1984 | Quinquis . | |
| 4,470,110 | 9/1984 | Chiarottino . | |
| 4,470,112 | 9/1984 | Dimmick . | |
| 4,494,113 | 1/1985 | Yamaoka | 370/85 |
| 4,511,959 | 4/1985 | Nicolas et al. | 364/200 |

Primary Examiner—James D. Thomas
Assistant Examiner—A. E. Williams, Jr.
Attorney, Agent, or Firm—William A. Linnell; Nicholas Prasinos

[57] ABSTRACT

In a data processing system, a bus is provided for the transfer of information between units coupled to the bus. The units are coupled in a priority arrangement which is distributed thereby providing priority logic in each of the units and allowing bus transfer cycles to be generated in an asynchronous manner. Priority is normally granted on the basis of physical position on the bus, highest priority being given to the first unit on the bus and lowest priority being given to the last unit on the bus. Each of the units includes priority logic which includes logic elements for requesting a bus cycle, such request being granted if no other higher priority unit has also requested a bus cycle. The request for and an indication of the grant of the bus cycle are stored in each unit so requesting and being granted the bus cycle respectively, only one such unit being capable of having the grant of a bus cycle at any given time, whereas any number of such units may have its request pending at any particular time. A modification to the priority logic allows a lowest priority unit to be physically positioned at other than the last unit position on the common bus.

17 Claims, 9 Drawing Figures

DISTRIBUTED PRIORITY NETWORK LOGIC FOR ALLOWING A LOW PRIORITY UNIT TO RESIDE IN A HIGH PRIORITY POSITION

BACKGROUND OF THE INVENTION

1. Field of the Invention

The apparatus of the present invention generally relates to data processing systems and more particularly to a priority network for providing transfer cycles over a common bus coupling a plurality of units in such system.

2. Description of the Prior Art

The apparatus of the present invention is an improvement to the priority logic described in U.S. Pat. No. 4,096,569, issued June 20, 1978 which was an improvement to the priority logic described in U.S. Pat. No. 4,030,075, issued on June 14, 1977, which patents are incorporated herein by reference. Such priority logic included in the priority network of such patents is distributed to each of the units coupled to the common bus so as to enable priority determination and thereby the granting of a bus cycle to the highest priority requesting unit without the need for a bus monitor, for example in a central processor, which may be one of the units coupled to the bus. Each such priority logic includes three bistable elements, one of which indicates an internal request for use of the bus, another of which indicates on the bus that an internal request has been made, and a further one is provided to indicate that a bus cycle has been granted for this unit. Only one such unit's priority logic may have its so-called bistable element indicate that a bus cycle has been granted. The priority logic in more than one unit may have their so-called request bistable elements set to indicate that they desire bus cycles. Typically, the unit transferring information to another unit receives a response. Such response may either be a signal indicating that the information transferred has been accepted (an ACK signal), that the information transferred has not been accepted (a NACK signal), or a signal indicating that the information has not been accepted by the receiving unit but that such receiving unit will be enabled to so receive such information possibly during the next bus cycle (a WAIT signal). In response to either of these signals, it has been shown in such aforementioned U.S. Pat. No. 4,030,075 that the so-called grant bistable element which has been set, may be reset so that each of the units on the bus may again in parallel attempt to gain access to the bus, thereby avoiding a situation where one unit which had previously been granted access to the bus is unable to gain such access until its receiving unit responds by indicating it has received such information. In such aforementioned U.S. Pat. No. 4,030,075, it was shown that the so-called ACK or NACK signals would also cause the so-called request bistable element to be reset or cleared. However, in so resetting such request bistable element, it is important that only the unit which had its grant bistable element set have its request bistable element reset. Otherwise, each of the request bistable elements in each of the units would be reset. This would then require that each of such units that did not have its grant bistable element set have its so-called request bistable element set again. In order to avoid such operation, it was necesssary to include logic by which the unit so setting its so-called grant bistable element retain a history of such action. This required additional logic in the system and, accordingly, it was considered desirable to eliminate such excess logic thereby reducing the space and power requirement in the system while still maintaining priority logic which was distributed, asynchronous in nature and which retain the speed required of the system.

Accordingly, it was the object of the U.S. Pat. No. 4,096,569 to provide improved priority logic for use in a data processing system in which a plurality of units are coupled over a common bus. In the U.S. Pat. No. 4,096,569, each such priority logic comprised a first bistable element for asynchronously indicating that a representative unit is ready to transfer information over the bus, a second bistable element responsive to the first bistable element responsive to the first bistable element for generating a first signal on the bus indicating to each of the units that the representative unit is ready to transfer information over the bus, apparatus responsive to the second bistable element in each of the units having a higher priority than the representative unit for indicating that the representative unit is in the highest priority unit and a third bistable element responsive to the first signal generated by the second bistable element and an indication that there is no other higher priority unit ready to transfer information over the bus, for generating a second signal on the bus. Further, provide was apparatus which is responsive to the receipt of the second signal from the bus for generating a strobe signal for enabling the receipt of information from the representative unit and further apparatus which is responsive to the acknowledgement that the information has been so received, for disabling the third bistable element of the representative unit. Further, logic was also provided which is responsive to the disabling of the third bistable element for disabling the second bistable element of the representative unit, which is the only unit that had its third bistable element set.

The distributed tie-breaking network provides the function of granting bus cycles and resolving simultaneous requests for use of the bus. Under both the U.S. Pat. Nos. 4,096,569 and 4,030,075, priority is granted on the basis of physical position on the bus and the lowest priority being given to the last unit on the bus. The logic to accomplish the tie-breaking function is distributed identically among all units connected to the bus. In a typical system, the memory is granted the highest priority and the central processor unit (CPU) is granted the lowest priority because it has the lowest real time constraints with the other units being position on the basis of their performance requirements.

However, the CPU is the heaviest user of the common bus and in order to improve system performance, it is desirable to position it as close as possible to the memory. Accordingly, it is the primary objective of the present invention to provide improved priority logic which will allow a lowest priority unit to be physically positioned on the common bus at a position other than in the last unit position.

OBJECTS OF THE INVENTION

Accordingly, it is an object of the present invention to provide priority logic which allows a lowest priority unit to be physically positioned on a common bus at a position other than that normally occupied by the lowest priority unit.

It is a still further object of the present invention to provide a low cost priority logic.

3

This invention is pointed out with particularity in the appended claims. An understanding of the above and further objects and advantages of this invention can be obtained by referring to the following description taken in conjunction with the drawings.

SUMMARY OF THE INVENTION

The improved priority logic of the present invention is provided in a data processing system having a plurality of units to transfer information over a common bus, each of the units capable of either or both transferring or receiving information, wherein such priority logic is included in a distributed priority network wherein priority is normally determined by physical position on the common bus and wherein such priority logic is included in at least one of the units coupled with the common bus. Each such improved priority logic comprises a first bistable element for asynchronously indicating that a representative unit is ready to transfer information over the bus, a second bistable element responsive to the first bistable element and apparatus responsive to a first signal from the bus that indicates at least one other unit on the bus is ready to transfer information over the bus, the second bistable element for generating the first signal on the bus indicating to each of the units that the representative unit is ready to transfer information over the bus if no other unit is already so indicating that it is ready to transmit, apparatus responsive to the second bistable element in each of the units having a higher priority than the representative unit for indicating that the representative unit is the highest priority unit and a third bistable element response to the first signal generated by the second bistable element and an indication that there is no other higher priority unit ready to transfer information over the bus, for generating a second signal on the bus. Further, provided is apparatus which is responsive to the receipt of the second signal from the bus for generating a strobe signal for enabling the receipt of information from the representative unit and further apparatus which is responsive to the acknowledgement that the information has been so received, for disabling the third bistable element of the representative unit. Further logic is also provided which is responsive to the disabling of the third bistable element for unconditionally disabling the second bistable element of the representative unit. Further logic is also provided which is responsive to the disabling of the third bistable element for disabling the first bistable element of the representative unit if receiving unit was ready to receive the information from the bus and for allowing said first bistable element to continue to indicate that said representative unit is still ready to transfer information over the bus if the receiving unit was not ready to receive the information over the bus.

BRIEF DESCRIPTION OF THE DRAWINGS

The manner in which the apparatus of the present invention is constructed and its mode of operation can best be understood in the light of the following detailed description, together with the accompanying drawings, in which.

DESCRIPTION OF THE PREFERRED EMBODIMENT

Bus Request and Response Cycles

Figure 1:
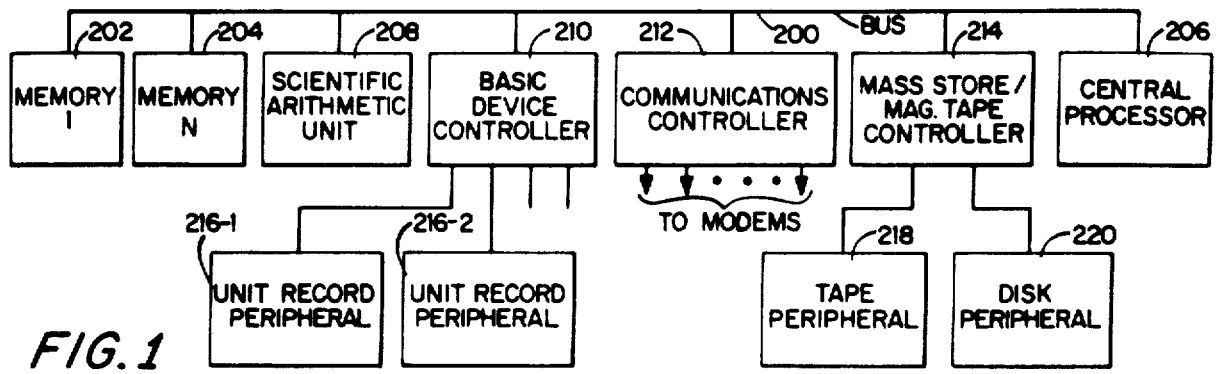
FIG. 1 is a general block diagram of the system of the present invention.

The data processing bus of the present invention provides a communication path between two units in the system. The bus is asynchronous in design enabling units of various speeds connected to the bus to operate efficiently in the same system. The design of the bus of the present invention permits communications including memory transfers, interrupts, data, status and command transfers. The overall configuration of a typical system is shown in FIG. 1. For a further description of the bus and interface logic of such system, U.S. Pat. Nos. 3,993,981, issued on Nov. 23, 1976 and 4,236,203, issued on Nov. 25, 1980, which are incorporated herein by reference, should be consulted.

The bus permits any two units to communicate with each other at a given time via common shared signal paths. Any unit wishing to communicate, requests a bus cycle. When that bus cycle is granted, that unit becomes the master and may address any other unit in the system as the slave. Some types of bus interchange require a response cycle (a single fetch memory read, for example). In cases where a response cycle is required, the requestor assumes the role of master, indicates that a response is required, and identifies itself to the slave. When the required information becomes availabe, (depending on slave response time), the slave then assumes the role of master, and initiates a transfer to the requesting unit. This completes the single fetch interchange which has taken two bus cycles in this case. Intervening time on the bus between these two cycles (the request cycle and the response cycle) may be used for other system traffic not involving these two units.

Bus Signals and Timing

Figure 2:
FIGS. 2 through 6 illustrate the format of various information transferred over the common bus of the present invention.
Figure 3:

A master may address any other unit on the bus as a slave. It does this by placing the slave address on the address leads. There may be 24 address leads for example which can have either of two interpretations depending on the state of an accompanying control lead called the memory reference signal (BSMREF). If the memory reference signal is a binary ZERO, the format of FIG. 2 applies to the address leads with the 24th such lead being the least significant bit. It should be noted that as used in this specification, the terms binary ZERO and binary ONE are used respectively to refer to the low and high states of electrical signals. If the memory reference signal is a binary ONE, the format for such 24 bits as shown in FIG. 3 applies. In essence, when the memory is being addresses, the bus enables up to 2 to the 24th power bytes to be directly addressed in memory. When units are passing control information, data or interrupts, they address each other by channel number. The channel number allows up to 2 to the 10th power channels to be addressed by the bus. Along with the channel number, a six bit function code is passed which specifies which of up to 2 to the 6th power possible functions this transfer implies.

Figure 4:
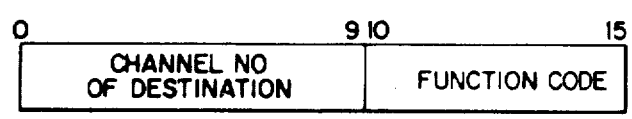

When a master requires a response cycle from the slave, it indicates this to the slave by one state (read command) of a control lead named BSWRITE— (the other state thereof not requiring a response, i.e., a write command). In this case, the master provides its own identity to the slave by means of a channel number. The data leads, as opposed to the bus address leads, are coded in accordance with the format of FIG. 4 to indicate the master's identity when a response is required from the slave. The response cycle is directed to the requestor by a non-memory reference transfer. The control lead, indicated as a second-half bus cycle (BSSHBC−), is enabled to designate that this is the awaited cycle (as compared to an unsolicited transfer from another unit). When a master requires a double fetch from a slave, it indicates this to the slave by one state of a control lead named, BSDBPL− (the other state thereof not requiring a double fetch, i.e., a single fetch). When the slave responds to the master's request, one state of this same control lead (BSDBPL−) is used to indicate to the requesting unit that this response cycle is the first response cycle of two response cycles (the other state thereof indicating that this is the last response cycle of a double fetch operation).

Figure 8:
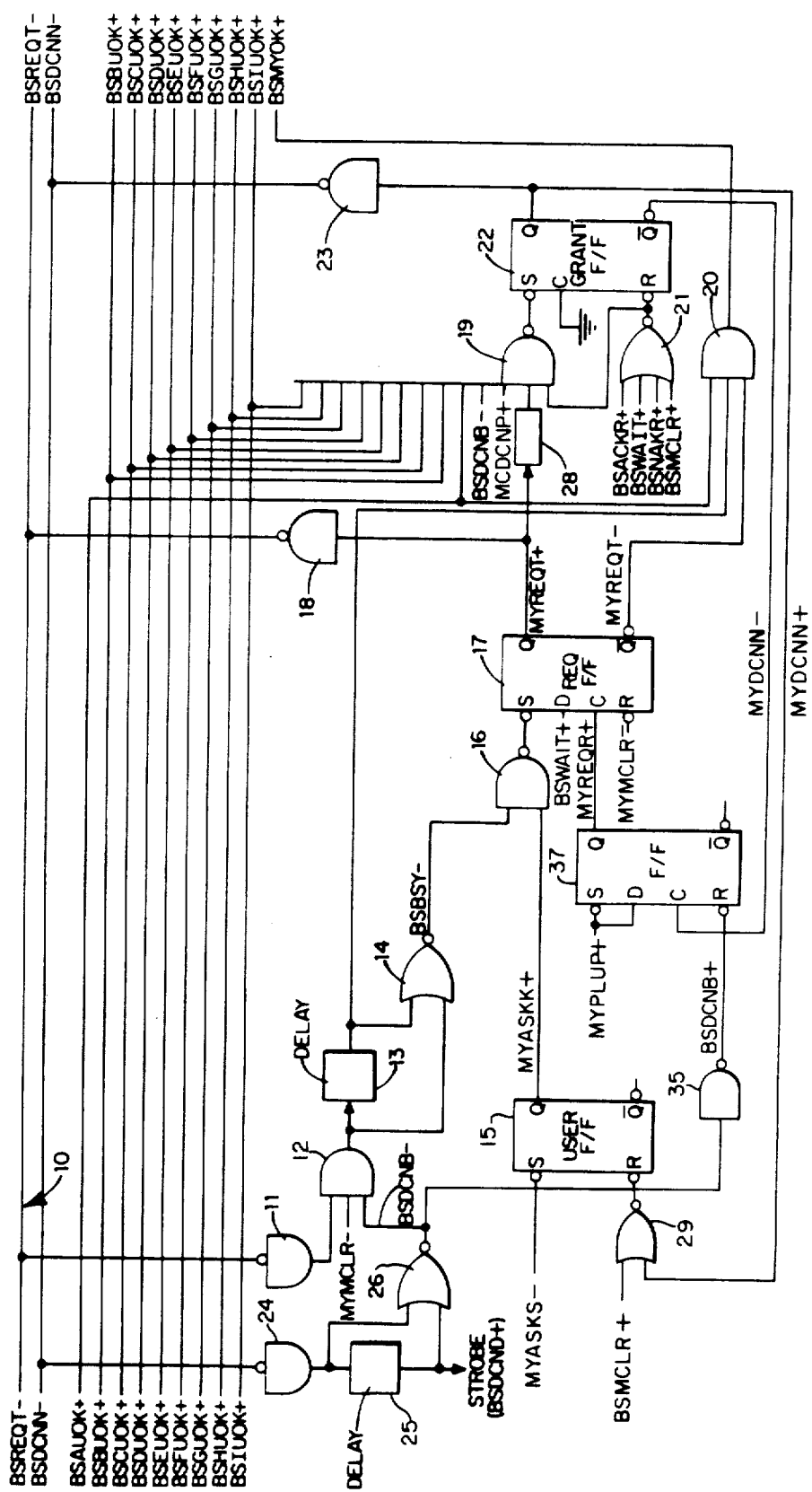
FIG. 8 illustrates a logic diagram of the prior art priority network.

The distributed tie-breaking network provides the function of granting bus cycles and resolving simultaneous requests for use of the bus. Priority is granted on the basis of physical position on the bus, the highest priority being given to the first unit on the bus. The logic to accomplish the tie-breaking function is distributed among all units connected to the bus and is fully described in U.S. Pat. No. 4,030,075, and an improvement thereof described in U.S. Pat. No. 4,096,569, both of which are incorporated herein by reference. In a typical system, the memory is granted the highest priority and the central processor is granted the lowest priority with the other units being position on the basis of their performance requirements. The prior art logic to accomplish the tie-breaking function for the central processor is shown in FIG. 8.

Thus, referring to FIG. 1, a typical system of the present invention includes a multiline bus 200 coupled with memory 1-202 through N-204, such memory having the highest priority and with the central processor 206 having the lowest priority. Also, connected on the bus may be included for example a scientific arithmetic unit 208 and various controllers 210, 212 and 214. Controller 210 may be coupled to control for example four unit record peripheral devices 216. Controller 212 may be used to provide communications control via modem devices whereas controller 214 may be utilized to control mass storage devices such as a tape peripheral device 218 or a disk peripheral device 220. As previously discussed, any one of the devices coupled with the bus 200 may address a memory or any other unit connected to the bus. Thus, tape peripheral 218 may, via controller 214, address memory 202.

As shall be hereinafter discussed, each of such units directly connected to the bus includes a tie-breaking logic as illustrated and discussed in U.S. Pat. No. 4,030,075 and an improvement thereof described in U.S. Pat. No. 4,096,569 and as will be discussed with respect to FIG. 8. Further, each one of such units includes address logic. The address logic for a typical basic device controller is also discussed in U.S. Pat. No. 4,030,075. Units not directly connected to the bus, such as units 216, 218 and 220, also have tie-breaking logic.

A channel number will exist for every end point in a particular system, with the exception of the memory type processing elements which are identified by the memory address. A channel number is assigned for each such device. Full duplex devices as well as half-duplex devices utilize two channel numbers. Output only or input only devices use only one channel number each. Channel numbers are easily variable and accordingly one or more hexadecimal rotary switches (thumb wheel switch) may be utilized for each such unit connected with the bus to indicate or set the unit's address. Thus, when a system is configured, the channel number may be designated for the particular unit connected to the bus as may be appropriate for that particular system. Units with multiple input/output (I/O) ports generally will require a block of consecutive channel numbers. By way of example, a four port unit may use rotary switches to assign the upper 7 bus of a channel number and may use the lower order 3 bits thereof to define the port number and to distinguish input ports from output ports. The channel number of the slave unit will appear on the address bus for all non-memory transfers as shown in FIG. 3. Each unit compares that number with its own internally stored number (internally stored by means of the rotary switches). The unit which achieves a compare is, by definition, the slave, and must respond to that cycle. Generally, no two points in a single system will be assigned to the same channel number. As shown in FIG. 3, a specific bus or I/O function can be performed as indicated by bits 18 through 23 of the bus address leads for non-memory transfers. Function codes may designate output or input operations. All odd function codes designate output transfers (write) while all even function codes designate input transfer requests (read). For example, a function code of 00(base 16) may be used to indicate a single fetch memory read and a function code of 20(base 16) may be used to indicate double fetch read operation. The central processor examines the least significant bit, 23, of the 6 bit function code field for an input/output command and uses a bus lead to designate the direction.

Figure 5:
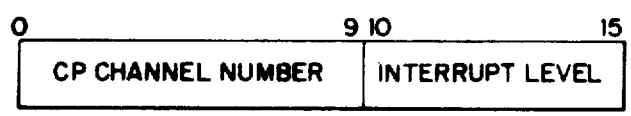

There are various output and input functional One the output functions is a command whereby a data quantity for example 16 bits is loaded into into the channel from the bus. The meanings of the individual data bits are component specific, but the data quantity is taken to mean the data to be stored, sent, transmitter, etc., depending upon the specific component functionality. Another such output function is a command whereby for example a 24 bit quantity is loaded into a channel address register (not shown). The address is a memory byte address and refers to the starting location in memory where the channel will commence input or output of data. Various other output functions include an output range command which defines the size of the memory buffer assigned to the channel for a specific transfer, an output control command which by its individual bits causes specific responses, output task functions such as print commands, output configuration which is a command to indicate functions such as terminal speed, card read mode, etc., and output interrupt control which is a command which loads for example a 16 bit word into the channel with the format as shown in FIG. 5. The first 10 bits indicate the central processor channel number and bits 10 through 15 indicate the interrupt level. Upon interrupt, the central processor channel number is returned on the address bus while the interrupt level is returned on the data bus.

The input functions include functions similar to the output functions except in this case the input data is transferred from the device to the bus. Thus, input functions include the input data, input address and input range commands as well as the task configuration and input input commands. In addition, there is included the device identification command whereby the channel places is device identification number of the bus. Also included are two input commands whereby a status word 1 or a status word 2 is placed on the bus from the channel as presently discussed.

The indication from status word 1 may include for example whether or not the specific device is operational, whether it is ready to accept information from the bus, whether there is an error status or whether attention is required. Status word 2 may include for example an indication of parity, whether there is a non-correctable memory or a corrected memory error, whether there is a legal command or for example whether there is a non-existent device or resource.

Figure 6:
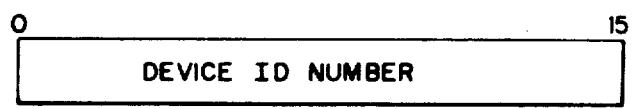

As previously discussed, a unique device identification number is assigned to every different type of device which is connected to the bus. This number is presented on the bus in response to the input function command entitled input device identification. This number is placed on the data bus in the format shown in FIG. 6. For convenience, the number is separation into 13 bits identifying the device (bits 0 through 12) and three bits identifying certain functionality of the device (bits 13 through 15) as may be required.

Figure 7:
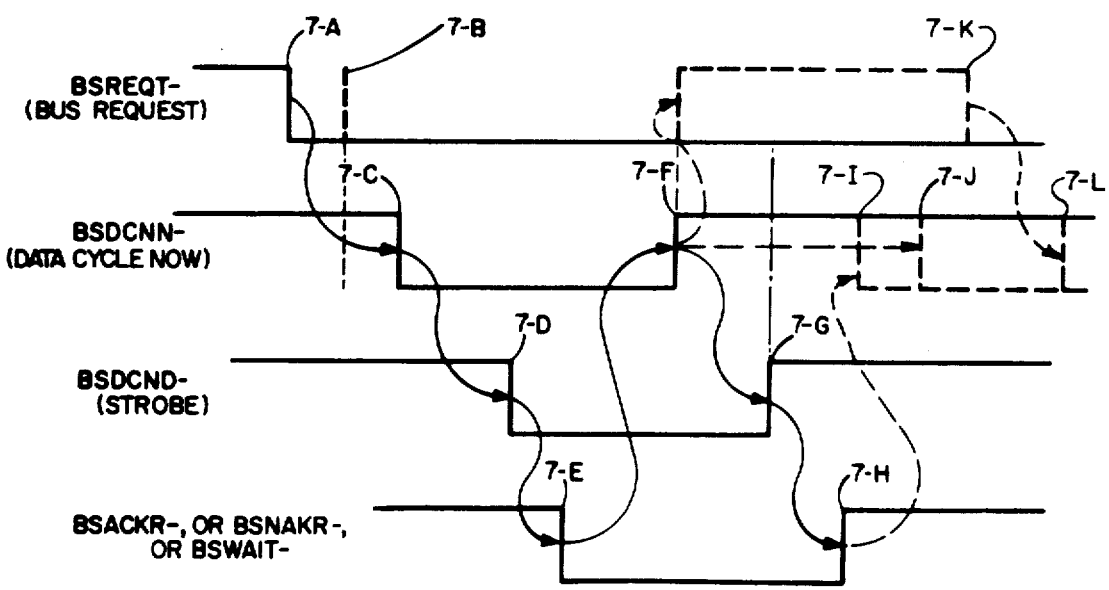
FIG. 7 illustrates a timing diagram of the operation of the bus of the present invention.
Figure 9:
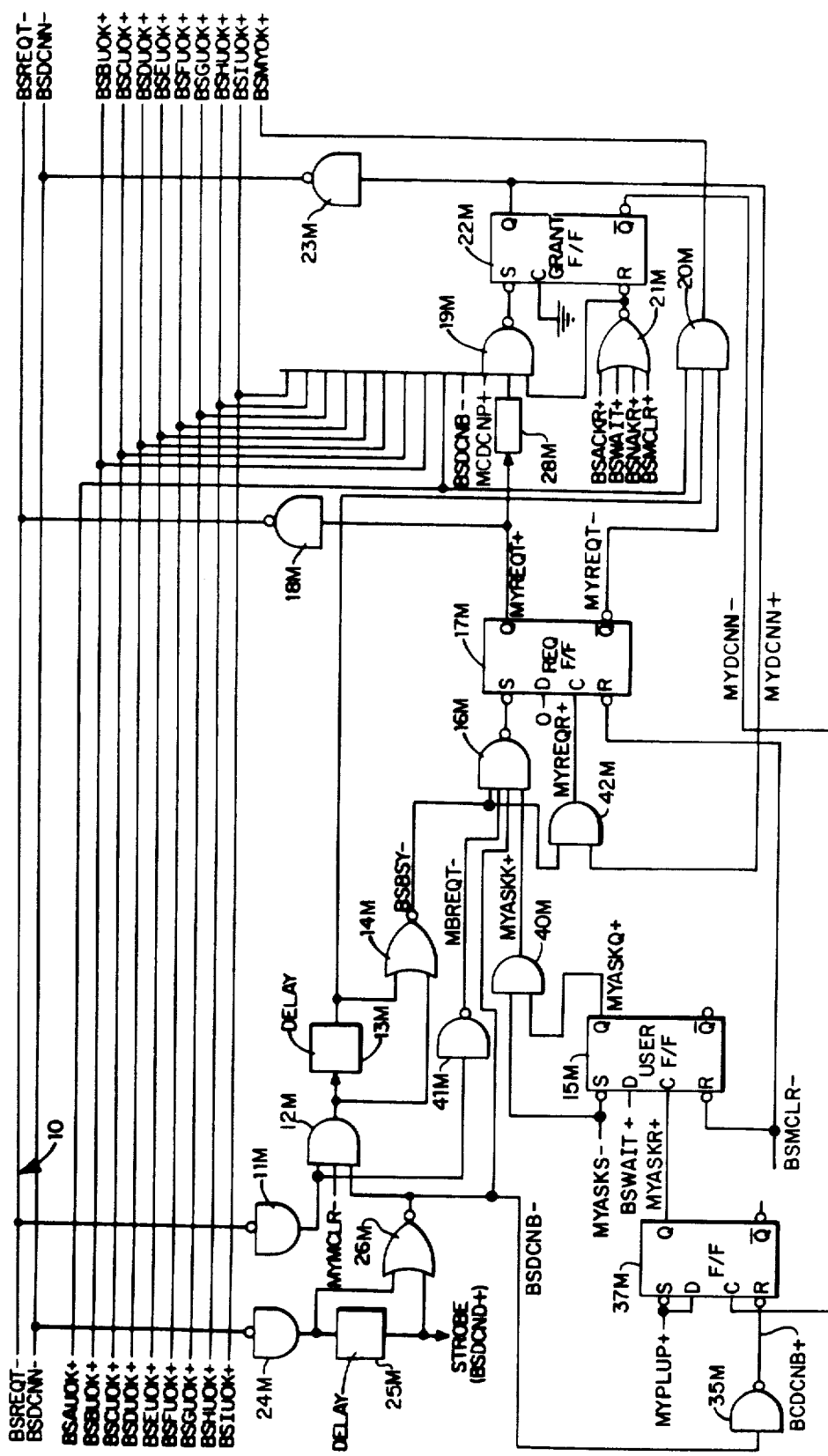
FIG. 9 illustrates a logic diagram of the priority network of the present invention.

A unit wishing to interrupt the central processor requests a bus cycle. When this bus cycle is granted, the unit places its interrupt vector on the bus, the interrupt vector including the channel number of the central processor and the interrupt level number. The unit thus provides, as its interrupt vector, the master's channel number and its interrupt level number. If this is the central processor's channel number, the central processor will accept the interrupt if the level presented is numerically smaller than the current internal central processor level and if the central processor has not just accepted another interrupt. Acceptance is indicated by a bus ACK signal (BSNAKR−). If the central processor cannot accept the interrupt, a NACK signal is returned (BSNAKR−). Devices receiving a NACK (sometimes referred to as NACK) signal will retry when a signal indicating resume normal interrupting is received from the central processor (BSRINT−). The central processor issues this signal when it has completed a level change and therefor may be capable of accepting interrupts once again. The channel number of the master is supplied in the vector for use since more than one channel may be at the same interrupt level. Interrupt level 0 is of special significance since it is defined to mean that the unit shall not interrupt FIG. 7 illustrates the bus timing diagram and will be discussed more specifically hereinafter. Generally, however the timing is a s follows. The timing applies to all transfers from a master unit to a slave unit connected to the bus. The speed at which the transfer can occur is dependent upon the configuration of the system. That is, the more units connected to the bus and the longer the bus, then, due to propagation delays, the longer it takes to communicate on the bus. On the other hand, the lesser amount of units on the bus decreases the response time. Accordingly, the bus timing is truly asynchronous in nature. A master which wishes a bus cycle makes a bus request. The signal BSREQT− is common to all units on the bus and if a binary ZERO, indicates that at least one unit is requesting a busy cycle. When a bus cycle is granted, the signal BSDCNN− becomes a binary ZERO indicating that a tie-breaking function as more specifically discussed with respect to FIGS. 8 and 9 is complete and that one specific master now has control of the bus. At the time the signal BSDCNN− becomes a binary ZERO, the master applies the information to be transferred to the bus. Each unit on the bus develops an internal strobe from the signal BSDCNN−. The strobe is delayed for example approximately 60 nanoseconds from the reception of the binary ZERO state of the BSDCNN− signal. When the delay is complete in the slave, the bus propagation time variations will have been accounted for and each slave unit would have been able to recognize its address (memory address or channel number). The addresses slave can make one of these responses, either an ACK, NACK or a WAIT signal or more specifically a BSACKR−, a BSNAKR− or a BSWAIT− signal. The response is sent out on the bus and serves as s signal to the master that the slave has recognized the requested action. The control lines then return to the binary ONE state in the sequence as thrown in FIG. 7. Thus, the bus handshake is fully asynchronous and each transition has been received. Individual units may therefore take different lengths of time between the strobe and the ACK, etc. transition depending on their internal functionality. A bus timeout function exists to prevent hang-ups which would occur.

Information which is transferred over the bus can include for example 50 signal or bits, which may be broke down as follows: 24 address bits, 16 data bits, 5 control bits and 5 integrity bits. Thee various signals will be discussed hereinafter.

The prior art tie-breaking function, more specifically described with respect to FIG. 8 is that of resolving simultaneous request from different units for service and granting bus cycles on a basis of a positional priority system. As indicated hereinbefore, the memory has the highest priority and the central processor has the lowest priority physically at opposite ends of the bus 200. Other units occupy intermediate positions and have priority which increases relative to their proximity to the memory end of the bus. The priority logic is included in each of the units. directly connected to the bus in order to accomplish the tie-breaking function. Each such unit's priority network includes a grant flip-flop. At any point in time, only one specific grant flip-flop may be set and that unit by definition is the master for that specific bus cycle. Any unit may make a user request at any time thus setting its user flip-flop. At any time therefore, many user flip-flops may be set, each representing a future bus cycle. In addition, each unit on the bus contains a request flip-flop. When all units are considered together, the request flip-flops may be considered as a request register. It is the outputs of this register that supply the tie-breaking network which functions to set only one grant flip-flop no matter how may requests are pending. More specifically of there were no pending requests then no request flip-flops would be set. The first user flip-flops to set would cause its request flip-flop to set. This in turn would inhibit, after a short delay as hereinafter described, other devices from setting their request flip-flops. Thus what occurs is that a snap-shot of all user requests is taken for the given period in time (the delay period). The result is that a number of request flip-flops may be set during this delay period depending upon their arrival. In order to allow the request flip-flops to have their outputs become stable, each unit includes such delay in order to insure that such stabilization has occurred. A particular grant flip-flop is set if the unit associated therewith has had its request flip-flop set and the delay time has elapsed and no higher priority unit wants the bus cycle. A strobe signal is then generated after another delay period and finally the grant flip-flop is cleared (reset) when the master receives and ACK, NACK or WAIT signal from the slave unit.

As indicated hereinbefore, there are three possible slave responses, the ACK, the WAIT or the NACK signal. In addition, there is a fourth state in which there is no response at all. In the case where no unit on the bus recognizes the transfer as address to it, no response will be forth coming. A time out function will then take place and a NACK signal will be received thereby clearing the bus. An ACK signal will be generated if the slave is capable of accepting the bus transfer from the master and wishes to do so. The WAIT response is generated by the slave if the slave is temporarily busy and cannot accept a transfer at this time. Upon receipt of the WAIT signal, the aster will retry the cycle at the next bus cycle granted to it and continue to do so until successful. Some of the causes of a WAIT response from a slave, when the central processor is the master, are for example, when the memory is a slave and the memory is responding to a request from another unit or when a controller iis a slave, for example, if the controller is waiting for a response from memory or if the controller has not yet processed the previous input/output command. The NACK signal indicated by the slave means it accepts a transfer at this time. Upon receipt of a NACK signal, a master unit will not immediately retry but will take specific action depending upon the type of master.

As generally indicated hereinbefore, there are basic timing signals on the bus which accomplish the handshaking function thereof. These five signals, as discussed hereinbefore, are bus request signal (BSREQT−) which when a binary ZERO, indicates that one or more units on the bus have requested the bus cycle; the data cycle now signal (BSDCNN−) which when a binary ZERO indicates a specific master is making a bus transfer and has placed information on the bus for use by some specific slave; the ACK signal (BSACKR−) which is a signal generated by the slave to the master that the slave is accepting this transfer by making this signal a binary ZERO; the NACK signal (BSNAKR−) which is a signal generated by the slave to the master indicating to the master when it is a binary ZERO that is refusing this transfer; and the WAIT signal (BSWAIT−) which is a signal generated by the slave to the master indicating when it is a binary ZERO tht the slave is postponing the decision on the transfer.

In addition and as indicated hereinbefore, there may be as much as fifty information signal which are transferred as the information content of each bus cycle. These signals are valid for use by the slave on the leading edge of the strobe signal.

In addition to the other control signals, also provided on the bus may be the bus clear (BSMCLR−) signal which is normally a binary ONE and which becomes a binary ZERO when the master clear button which may be located on the central processor's maintenance panel, is actuated. The bus clear signal may also become a binary ZERO during a power up sequence for example.

The timing diagram of FIG. 7 will now be more specifically discussed in detail with respect to the address logic circuitry of the memory and the central processing unit.

With reference to the timing diagram of FIG. 7 in every bus cycle there are three identifiable parts, more particularly, the period (7-A to 7-C) during which the highest priority requesting device wins the bus, the period (7-C to 7-E) during which the master unit calls a slave unit, and the period (7-E to 7-G) during which the slave responds. When the bus is idle the bus request signal (BSREQT−) is a binary ONE. The bus request signal's negative going edge at time 7-A starts a priority net cycle. There is an asynchronous delay allowed within the system for the priority is to settle (at time 7-B) and a master user of the bus to be selected. The next signal on the bus is the BSDCNN− or data cycle now signal. The BSDCN− signal's transition to a binary ZERO at time 7-C means that use of the bus has been granted to a master unit. Thereafter, the second phase of bus operation means the master has been selected and is now free to transfer information on the data, address and control leads of the bus 200 to a slave unit, that the master so designates.

The slave unit prepares the third phase of bus operation beginning at the negative going edge of the strobe or BSDCND− signal. The strobe signal is delayed, for example, sixty (60) nanoseconds from the negative going edge of BSDCNN− signal by delay line 25 of FIG. 8. Upon the occurrence of the negative going edge of BSDCND− signal at time 7-D, the slave unit can now test to see if this is his address and if he is going called to start the decision making processor of what response to generate. Typically, this will cause an acknowledge signal (BSACKR−) to be generated by the slave unit or in the non-typical cases a BSNAKR− or BSWAIT− signal or even no response at all (for the case of a non-existent slave) may be generated as herein described. The negative going edge of the acknowledge signal at time 7-E when received by the aster unit, causes the master's BSDCNN− signal to go to a binary ONE at time 7-F. The strobe signal returns to the binary ONE state at time 7-G which is a delay provided by delay line 25 from time 7-F. Thus, in the third phase of bus operation, the data and address on the bus are stored by the slave unit and the bus cycle will begin to turn off. The ending of the cycle, i.e., when BSDCNN− goes to to binary ONE, dynamically enables another priority net resolution. A bus request signal may, at this time, be generated and if not received this means that the bus will return to the idle state, and accordingly the RSREQT− signal would go to the binary ONE state. If the bus rquest signal is present at that time, i.e., an binary ZERO as shown, it will start the asynchronous priority net selection process following which another negative going edge of the BSDCNN− signal will be enabled as shown by the dotted lines as time 7-I and 7-J. It should be noted that this priority net resolution need not wait or be triggered by the positive going edge of the acknowledge signal at time 7-H, but may in fact be triggered at a time 7-F just following the transition of the bus to an idle state if thereafter a unit desires a bus cycle. Although the priority net resolution can be triggered at time 7-F by the positive going edge of the BSDCNN− signal, the second negative going edge of the BSDCNN− signal, in response to the setting of grant flip-flop 22 of FIG. 8 must await the positive going edge of the acknowledge signal at time 7-H, i.e., the binary ZERO from NOR gate 21 or FIG. 8 must be removed from the reset input of grant flip-flop 2. The negative going edge of the BSDCNN− signal at time 7-I illustrates the case where the priority net resolution is triggered at time 7-F and the resolution occurs before time 7-H. The negative going edge of the BSDCNN− signal at tie 7-J illustrates the case where the acknowledge signal clears before the resolution of the priority net. The negative going edge of the BSDCNN− signal at time 7-L illustrates the case where there is no bus request at time 7-F and the priority net resolution is triggered by a later bus request signal BSREQT− at time 7-K. This process repeats in an asynchronous manner.

A fetch memory operation will now be discussed by way of example. In the example, the central processor will make a fetch request of memory and the two bus cycles associated with the request and response will be examined. during the first bus cycle, the central processor is the master and the memory is the slave. During this first cycle, the central processor bids for the bus using the priority network logic of FIG. 8 and the memory controller responds. During the second bus cycle, in which the memory controller is the master and the central processor is the slave, the memory bids for the bus using the priority network logic and the central processor responds using bus interface logic.

Prior Art Priority Network Logic

Now referring to the prior art priority net logic of FIG. 8 the priority net cycle is initially in an idle state and the bus request signal (BSREQT−) on line 10 is a binary ONE. When this bus request signal is a binary ONE, the output of receiver (inverting amplifier) 11 will be a binary ZERO. The output of receiver 11 is coupled to one input of AND gate 12. The other inputs to gate 12 are the master clear signal (MYMCLR−) which is normally a binary ONE and the output of NOR gate 26 which is normally a binary ONE also. The output of gate 12, during the bus idle state is thus a binary ZERO, and thus the output of delay line 13 will be a binary ZERO. The input and the output of the delay line 13 being a binary ZERO allows the output of NOR gate 14 (BSBSY−) to be a binary ONE. When one of the units connected to the bus desires a bus cycle, it asynchronously sets its user flip-flop 15 so that its Q output (MYASKK+) is a binary ONE.

Thus, with the bus in the idle state, the first event that occurs as the bus goes to the busy state is that the user sets its user flip-flop 15. In the case of the central processor, user flip-flop 15 can be set by signal MYASKS− at its set (S) input becoming a binary ZERO. Alternatively, user flip-flop 15 could be set by a clocking signal transitioning from the binary ZERO to binary ONE state at its clocking (C) input (not shown in FIG. 8) and thereby clocking a binary ONE at its data (D) input (not shown in FIG. 8) into user flip-flop 15 to set it. When both inputs to NAND gate 16 are a binary ONE state, the output thereof is a binary ZERO. This sets the request flip-flop 17 so that its Q output (MYREQT+) is a binary ONE. Thus, in an asynchronous manner, the Q output of request flip-flop 17 will be a binary ONE. This operation can be coincidentally occurring in the similar logic of the other units connected with the bus.

The binary ONE state of the MYREQT+ signal will be placed on line 10 of the bus via driver 18 as a binary ZERO. Thus referring to the timing diagram of FIG. 7, the BSREQT− signal goes negative or to a binary ZERO state. Any request to the system from any one of the request flip-flops 1 of the various units connected to the bus will thus hold line 10 in the binary ZERO state.

The delay lie 13 includes sufficient delay to compensate for the propagation delay encountered by elements 14, 16 and 17. Thus, every though a device sets it request flip-flop 17, this does not mean that a higher priority device, which also requests a bus cycle, will not take the next bus cycle. For example, if a lower priority device sets its request flip-flop 17, the binary ZERO signal on line 10 is fed back to all devices, including the higher priority device, which in turn generates a binary ONE state at the output of its gate 12 so as to generate a binary ZERO state at the output of NOR gate 14, thereby disabling the setting of the request flip-flop 17 of such other high priority device, if in fact the user flip-flop 15 of such higher priority device has not already been set. Once the delay time of, for example, 20 nanoseconds has expired and the output of delay line 13 of such higher priority device is now a binary ONE state, then the output of gate 14 will be a binary ZERO state so that independent of whether or not the user flip-flop 15 of such higher priority device has been set, the output of gate 16 will be a binary ONE thereby disabling the setting of request flip-flop 17. Thus, during such time frame, all devices have their request flip-flop 17 set if in fact they are requesting service as indicated by the setting of their user flip-flop 15. After the delay time provided by element 13 of the device first requesting a bus cycle, a device not having had its request flip-flop 17 set cannot do so until after the priority cycle is completed. Thus, the higher priority device will win the bus even if its user flip-flop is set a few nanoseconds after the lower priority device sets its flip-flop.

Thus, all of the request flip-flops 17 for devices seeking bus cycle will have been set during each interval as indicated by the delay line arrangement of delay line 13. Notwithstanding that many of such devices coupled with the bus may have their request flip-flops set during such time interval, only one such device may have its grant flip-flop 22 set. The device that has its grant flip-flop 22 set will be the highest priority device seeking the bus cycle. When such highest priority device seeking a bus cycle. When such highest priority device seeking a bus cycle has completed its operation during such bus cycle, the other devices which have their request flip-flops set, will again seek the next such bus cycle and so on. Thus, the Q output of request flip-flop 17 in addition to being coupled to driver 18 is also coupled to one input of NAND gate 19 via element 28. Element 28 is no more than a direct connection for each unit's priority logic, except that unit (usually the memory 202) which is coupled to the highest priority end of the bus 200, in which sole case element 28 is a delay element as explained hereinafter. The Q-bar output (MYREQT−) of flip-flop 17 is coupled to one input of AND gate 20. The other inputs to gate 19 are received from the higher priority devices and more particularly, for example, nine preceding higher priority devices. These signals received from the higher priority devices are shown to be received from the left-hand side of FIG. 8 as signals BSAUOK+ through BSIUOK+. If any one of such nine signals is a binary ZERO, this will mean that a higher priority device has requested a bus cycle and accordingly this will inhibit the current device from having its grant flip-flop set and thereby disable it from having the next bus cycle.

The other inputs received by gate 19 are from the NOR gate 26, i.e., the BSDCNB− signal and the output of NOR gate 21. In addition, a user ready signal, i.e., the MCDCNP+ signal in the case of the central processor, may be received from the particular unit's other logic by which, the particular unit, even though requesting a bus cycle, may delay it by changing the user ready signal to the binary ZERO state. That is, the unit even though not ready for a bus cycle may request it and set the user ready signal to a binary ZERO, in anticipation that it will be ready by the time the bus cycle is granted. The output of NOR gate 26 is normally a binary ONE and if all other inputs to gate 19 are a binary ONE. then grant flip-flop 22 will be set. The other input from gate 21 is a binary ONE grant flip-flop 22 will set set. The other input from gate 24 is a binary ONE when the bus is in an idle state. The inputs to NOR gate 21 are the BSACKR+ signal, the BSWAIT+ signal, the BSNAKR+ signal, and the BSMCLR+ signal. If any one of these signals is a binary ONE, then the bus will accordingly be in a busy state the the grant flip-flop 22 cannot be set.

If grant flip-flop 22 has been set, the Q output signal (MUDCNN+) is a binary ONE and will be inverted to a binary ZERO signal by inverter 23 and will be placed on the bus on signal line BSDCNN−. This is shown in the timing diagram of FIG. 7 wherein the BSDCNN− signal goes from the binary ONE to the binary ZERO state. Thus, the priority cycle of the bus cycle is completed.

In addition, if the present device does require service and is the highest priority device, the output from delay 13 and the BSAUOK+ priority line will be a binary ONE, however, the Q-bar output of flip-flop 17 will be a binary ZERO thereby placing a binary ZERO via AND gate 20 on the BSMYOK+ line thereby indicating to the next lower priority device and succeeding lower priority devices that there is a requesting higher priority device which will be using the next bus cycle, thereby inhibiting all lower priority devices from so using the next bus cycle. It should be noted that the nine priority lines received from the higher priority devices are transferred in a skewed manner by one position as signals BSBUOK+ through BSMYOK+. Thus, signal, BSAUOK+ received by the present device corresponds to signal BSBUOK+ received at the next higher priority device.

Having completed a priority cycle and having now caused a binary ZERO state to be placed on the BSDCNN− line, the signal is received by all such logic as shown in FIG. 8 by receiver 24. This causes the binary ONE state to be generated at the output of receiver 24 and a binary ZERO to be provided at the output of NOR gate 26 thereby disabling AND gate 12 from generating a binary ONE state. In addition, the binary ONE state at the output of receiver 24 is received by delay line 25 which is by way of example 60 nanoseconds in duration. The output of delay line 25 is also received at the other input of NOR gate 25 so as to continue to inhibit gate 12 when the strobe is generated. Thus, at the end of the delay line period established by delay line 25, the strobe (BSDCND+) signal is generated, the inversion of which, i.e., the BSDCND− signal is shown in the timing diagram of FIG. 7. The use of the strobe signal is hereinafter described. thus, the 60 nanosecond period produced by delay line 25 enables the winding device, i.e., the highest priority requesting device, to utilize the next bus cycle without interference. The strobe generated at the output of delay line 25 is used by a potential slave as a synchronizing signal.

If the strobe signal has been transmitted, then the one of the units which is designated as the slave, will; respond with either one of the signals ACK, WAIT, or NACK received at one of the inputs of gate 21. If in the typical case, the ACK is received for example, or if any of such response signals are received, this will reset the grant flip-flop 22 via gate 21. This response is shown in the timing diagram of FIG. 7 wherein the BSACKR− signal is shown to be received from the save thereby causing the BSDCNN− signal to change to the binary ONE state by the resetting of grant flip-flop 22. Flip-flop 15 will be reset via NOR gate 29 if the grant flip-flop 22 has been set, or if the bus clear signal (BSMCLR+) is received on the bus. Flip-flop 17 will be reset if the master clear signal (MYMCLR−) is received.

When the grant flip-flop 22 is set, its Q-bar output (MYDCNN−) goes to the binary ZERO state following which, when the grant flip-flop 22 is reset, the Q-bar output goes from the binary ZERO to the binary ONE state thereby effectively resetting request flip-flop 17 as shall be presently explained. As may be noted from the aforementioned U.S. Pat. No. 4,030,295, the request flip-flop 17 was shown to be reset by either the ACK, NACK or master clear signal. With respect to the ACK or NACK signals, this assumes that the device whose request flip-flop 17 is to be reset, retained in local storage such as flip-flop, the fact that it expected either an ACK, NACK or WAIT signal. Further, each unit's required logic which could discern that in fact such ACK or NACK signal was a response from a slave unit to this particular unit. Otherwise, a NACK or ACK signal would couple to reset all the flip-flops 17 thereby requiring that each of such request flip-flops 17 be set again. Accordingly, logic is minimized in the system by resetting the particular unit. This is accomplished by effectively coupling the Q-bar output of the grant flip-flop 22 to the clock input of request flip-flop 17. It should be noted that the ACK or NACK as well as the WAIT signal are utilized to reset the grant flip-flop 22, but in fact, only one grant flip-flop 22 could have been set. Thus, the resetting of all grant flip-flops makes no difference in the operation of the system.

In order to enable clock input of flip-flop 17, the signal received at such clock input must be a transition from the binary ZERO to the binary ONE state. When the clock input is so enabled, the signal at the D input thereof, i.e., the BSWAIT+ signal will have its state transferred to the Q output of flip-flop 17. Accordingly, in order to effectively reset flip-flop 17, the BSWAIT+ signal must be a binary ZERO when the clock input thereof is enabled. Since the BSWAIT+ signal is normally a binary ZERO, premature enabling of the clock input request flip-flop 17 may erroneously reset such flip-flop. This is so because the response from a slave unit cannot be anticipated, it being noted that the slave unit may in the alternative provide either an ACK, NACK or WIT signal, in which case of the WAIT signal, it is not desired to reset the request flip-flop 17. Thus the clock input should be enabled only when a response has been received from the slave unit. Otherwise, the WAIT signal may be in the binary ZERO state thereby prematurely resetting the request flip-flop 17. It can be seen that under normal conditions therefore that a direct connection from the Q-bar output to the clock input of flip-flop 17 would maintain a binary ONE state at such clock input, and that accordingly when grant flip-flop 22 is set and then reset, the change in state would enable such clock input of flip-flop 17. This condition, i.e., normally a binary ONE state at the clock input of flip-flop 17, has been found to delay the propagation of the setting action of such flip-flop wherein the Q-bar output thereof actually realizes the set condition, i.e., the binary ONE state. More particularly, for example, using a flip-flop whose part number is SN74S74 which is manufactured by a number of companies including, for example, Texas Instruments Inc. and Signetics Corporation, with the clock input at a binary ONE gate, it takes twice as long to realize the effect of the setting action than it does if the clock input is in the binary ZERO state. Accordingly, as can be seen by the connection of the clock input of flip-flop 22 to ground, this insures faster setting action for such grant flip-flop 22 and it is accordingly desirable to enable such increase in logic speed for the request flip-flop 17. Because of this, and the fact that the request flip-flop 17 should not be effectively reset until there is a response from the slave, elements 35 and 37 are coupled in the logic as shall be presently explained.

Before such explanation however, it should be noted that the provision of an inverter directly between the Q-bar output of grant flip-flop 22 and the clock input of request flip-flop 17 would not be satisfactory even though this would provide a normally binary ZERO state at the clock input of request flip-flop 17. This condition would not be satisfactory because the binary ONE to binary ZERO transition from the Q-bar output of flip-flop 22 when such flip-flop is set would become a binary ZERO to binary ONE transition which would enable the clock input of flip-flop 17 prematurely, that is, prior to knowing what the response from the slave unit will be.

Accordingly, inverter 35 is provided along with flip-flop 37. Like request flip-flop 27 the clock input of flip-flop 37 is not enabled until there is a transition from the binary ZERO to the binary ONE state or in other words, a positive going transition. This is accordingly received, as explained hereinabove, when the grant flip-flop 22 is reset by means of NOR gate 21.

Flip-flop 37 in addition to the clock input includes a set (S), a data (D) input, and a reset (R) input. The set input is effectively disabled by setting the input thereof to the binary ONE state by means of the MYPLUP+ signal which is not more than a signal received via a pullup resistor to a plus voltage. The D input of flip-flop 37 is also coupled to the MYPLUP+ signal. Normally the output of NOR gate 26 is a binary ONE and accordingly the output of inverter 35 (BSDCND+) is a binary ZERO. These conditions are changed when the BSDCNN+ signal goes to the binary ZERO state just after time 7-C, i.e, time 7-C plus the delay period associated with elements 24 and 26. Thus shortly after time 7-C the output of NOR gate 26 will change to the binary ZERO state thereby presenting a binary ONE state at the R input of flip-flop 37. It is noted that a change in the binary ONE state to the binary ZERO state will reset flip-flop 37 thereby presenting a binary ZERO state at the Q output (MYREQR+) of flip-flop 37. A binary ONE state at the output of inverter 35 continues for so long as the BSDCNN— signal is a binary ZERO and for 60 nanoseconds thereafter consistent with the delay period of delay 25. Shortly after the grant flip-flop 22 is reset and before the BSDCNN— signal has an effect on the output of NOR gate 26, the clock input of flip-flop 37 is enabled so that a binary ONE state at the D input thereof causes the Q output of flip-flop 37 to change from the binary ZERO to the binary ONE state thereby clocking flip-flop 17. At the time when the strobe signal, i.e., the BSDCND+ signal is no longer present, as can be seen with respect to the BSDCND— signal as shown in the timing diagram FIG. 7, and more particularly at time 7-G, the output of NOR gate 26 changes back to the binary ONE state thereby causing the output of inverter 35 to change from the binary ONE state to the binary ZERO state thereby resetting flip-flop 37. This ensures that the flip-flop 37 will be reset prior to the enabling of the clock input of flip-flop 37. The binary ZERO state thereafter continues to be present at the Q output signal MYREQR+ of flip-flop 37 until the above operation is again commenced.

As discussed hereinbefore, the coupling between the Q output of request flip-flop 17 and NAND gate 19 is dependent upon the position of the unit on the bus 200. More particularly, the element 28 in such coupling between flip-flop 17 and NAND gate 19 is a direct connection for all units which are not the highest priority unit. For the unit which is the highest priority unit and, more particularly, by the illustration of FIG. 1, memory 202, element 28 is a delay element similar to delay 13 and, by way of illustration, may include a delay of 20 nanoseconds. The reason for this is that in the highest priority unit the top nine inputs of its NAND gate 19 are a binary ONE signal. This binary ONE signal may be provided for each such one of the nine lines by means of a pullup resistor coupled thereto, the other end of which is coupled to a plus voltage source similar to the manner in which the MYPLUP+ signal is so coupled. With each of the nine inputs to NAND gate 19 being a binary ONE, and with the BSDCND— signal being normally a binary ONE and further assuming that the user ready signal (MCDCNP+ in FIG. 8) is in a binary ONE state, then without a delay element 28 in the priority logic of the highest priority unit, such highest priority unit would always win access to the bus without incurring the delay provided by delay 13. Thus, by providing a delay in element 38, this prevents the highest priority device from setting its grant flip-flop for the period of, for example, 20 nanoseconds after the time it sets its request flip-flop 17. In the highest priority unit, and in parallel with the delay element 28, a direct connection may also be provided with the other inputs to gate 19 so as to avoid the enabling of gate 19 due to a momentary pulse generated at the Q output of flip-flop 17 because of, for example, a race condition in the logic of FIG. 8.

Thus, in this manner, the highest priority unit is also prevent from gaining access to the bus 200 during a bus cycle of another unit. This is so because signal BSDCNG— will be a binary ZERO if, in fact, another bus cycle is in process. It can be seen that this inhibiting of the priority logic of the highest priority unit may be accomplished in other ways. For example, as explained in the aforementioned U.S. Patent, the output of delay 13 may be coupled to another input of NAND gate 19 in which case, for each priority logic of each unit, this would replace the need for BSDCNB— signal at one input of gate 19 and the need for a delay element 28 in the priority logic of the highest priority unit. However, in logic which requires the extreme speed as indicated herein, loading effects depending upon the component pick may present a problem. Accordingly, by the technique as explained herein, the delay 13 includes two element loads as opposed to three element loads. It can be further seen that such loading problem might be prevented by placing a driver or amplifying element at the output of delay 13, the output of which drive would be coupled to NAND gate 19, NOR gate 14 and AND gate 20, without presenting a loading problem. However, this has the effect of slowing down the operation of the priority logic by a factor determined by a propagation delay through such driver element.

The generation of a WAIT signal from any one of the controllers allows a device or controller of higher priority to break into the sequence of the bus cycles and use the bus as necessary. If there is not a higher priority unit which is requesting service, the particular master/slave arrangement will be maintained until the acknowledge is received by the master thereby ending the WAIT condition. Following this, another user is allowed to use the bus. Thus, the BSDCNN+ signal allows a slave to generate any one for three responses, either the NACK, WAIT or ACK signals. At the end of any one of these responses, a new priority net cycle occurs and this particular device gains access to the bus or another higher priority device wins the bus. It should be understood at this point that signal states on the bus are the inverse in binary state to those signals shown internal to the units. For example, the bus request signal is referred to on the bus, between for example driver 18 and receiver 11 in FIG. 8 to be one state and in the opposite state in the controllers themselves. Further, as indicated hereinbefore fourth response between any one of the controller connected on the bus is that there is no response at all. Thus, if one of the masters is calling for service from the memory and this memory is not installed in the system, a time out element, well known in the art, will generate a signal after a certain period of time, such as for example 5 microseconds, thereby generating a NACK signal. At the point, a central processor may take action such as by an interrupt or trap routine.

As indicated hereinbefore, when information is being transferred from the memory, the memory can never receive a NACK or WAIT signal. This is because of the inherent priority arrangement of the apparatus of the present invention. The memory is the highest priority device. If a unit has asked memory to sent it information, then the unit can expect the information at some point in time. If the unit generates a WAIT or NACK signal to the memory, then because the memory is the highest priority device, the memory could keep trying to gain access to the particular controller which requested the data transfer and could hang up the bus, i.e., it could because the memory is the highest priority device, cause the bus to effectively disable further data transfers until the data is accepted by the particular controller which had previously asked for it. In actual practice, the memory controller priority network logic is a little different from that shown in FIG. 8. In FIG. 8, a WAIT or NACK response to the memory will result in the grant flip-flop 22 being reset by a BSWAIT+ or BSNAKR+ signal appearing at the input of NOR gate 21. This results in the resetting of user flip-flop 15 and NOR gate 29 which will result in the resetting of request flip-flop 17. In the memory controller priority network logic, the Q-bar output of user flip-flop 15 is connected to the reset (R) input of request flip-flop 17. The effect of these resettings is that a WAIT or NACK response to memory will result in the memory not trying again to transfer the data to the requesting unit and the data will therefore in effect be lost. Thus, only an acknowledge signal can be made in response to a request from memory to accept data. A controller however is allowed to generate a NACK or WAIT signal to another controller or control processor without loss of data. In addition, a general rule is that if one controller requests information from a controller of higher priority, the requesting controller must be ready to accept the information, and accordingly must respond with an ACK signal.

If the device is not ready, then the NACK signal, other conditions being met, will be generated. The reason the NACK signal is generated rather than the WAIT signal is because of the fact that typically, if a controller such as controller 210, is busy, the terminal will be busy more than just a few nanoseconds but rather will be busy for milliseconds. Thus, cycle time would be wasted if the indication to the master is that the master keep trying. Rather, the indication should be that the requesting unit go on with data processing rather than unnecessarily using bus cycles thereby delaying the overall response of the system. All the requesting unit has to do is at its convenience retry the destination unit.

Modified Priority Network Logic

FIG. 9 shows the modified priority logic of the present invention that allows a low priority unit to occupy a high priority position on the bus and to request a bus cycle, perform tie-breaking and generate a data cycle now (BSDCNN−) signal. All other units on the bus have similar logic for the hand-shaking function, e.g., the central processor has a priority network logic shown in FIG. 8. Shown in FIG. 9 is a modified priority network logic which allows the CPU to remain the lowest priority unit but to be physically placed on the bus 200 in a position adjacent to memory which has the highest priority on the bus. That is, using the modified priority logic of FIG. 9, the central processor 206 of FIG. 1 could be physically positioned between memory 204 and scientific arithmetic unit 208. Because of the similarity of logic elements and functions between the priority network logic of FIG. 8 and FIG. 9 only the differences will hereinafter be discussed. That is, in FIG. 9, elements 11M, 12M, 13M, 14M, 18M, 19M, 20M, 21M, 22M, 23M, 24M, 25M, 26M, 28M and 35M are identical to and function the same as the corresponding elements 11 through 35, respectively, of FIG. 8. Elements 15M, 16M, 17M and 37M of FIG. 9 are similar to elements 15 through 37, respectively, of FIG. 8 and only the differences will be hereinafter discussed. Element 29 of FIG. 8 is not present in the modified priority network logic of FIG. 9 and elements 40M, 41M and 42M have been added to the logic in FIG. 9.

Before discussing in detail the logic of FIG. 9, the reason for positioning the CPU, which is the lowest priority unit on the bus, next to the memory, which is the highest priority on the bus, will be briefly reviewed. The memory units must be the highest priority units on the bus so that during second half bus cycles the memory may request the bus and win it over any other unit requesting the bus and therefore be guaranteed that the memory will be able to return data to the unit which hhas made a memory request. If the memory was not the highest priority unit on the bus, after a first unit has made a memory request and before the memory has had an opportunity to return the requested data to the first unit during a second half bus cycle, a second unit could make a memory request and find that the memory was busy. If the second unit was higher in priority than the memory, its continual request for the bus would block the memory from winning the bus and returning data to the first requesting unit. This situation in which the second unit would continue to make a request that would be higher priority than that of the memory would result in a deadly embrace and thereby block all other units from gaining access to the bus. Therefore, the system must be organized such that the memory is the highest priority unit on the bus. The present invention involves modifying the priority network logic shown in FIG. 8 to produce the modified priority logic shown in FIG. 9 which allows the CPU to be placed physically next to the memory along the bus while still maintaining the CPU as the lowest priority unit on the bus although it is not positioned at the low priority physical end of the bus.

As seen above, when discussing FIG. 8, if the priority network of FIG. 8 was used in the CPU while positioned physically next to the memory along the bus, each time the CPU and any other non-memory unit positioned on the bus simultaneously requested use of the bus, the CPU would win the bus because the CPU is placed physically along the bus in a higher priority position. If the CPU and the other unit do not simultaneously make a request, the first unit making the request would win the bus and the second unit will postpone making its request until the bus becomes free. Therefore, the priority network logic of FIG. 8 basically determines the winner between simultaneous requests. Requests are simultaneous when two or more units on the bus each set their request flip-flop 17 at the same time thereby making signal BSREQT— a binary ZERO and initiating a bus cycle. As seen above in discussion of FIG. 8, if two or more units simultaneously set their request flip-flop 17, the unit that is in the highest priority position will win the bus cycle and set its grant flip-flop 22. Upon completion of the first bus cycle, which was won by the highest priority of the simultaneously requesting units, the non-winning units will still have their request flip-flop 17 set and a second bus cycle will be initiated and this bus cycle will be won by the highest priority unit that has its request flip-flop set. This process will continue until all units who have their request flip-flops set have been serviced and their request flip-flops are reset.

It is this functioning of this priority network logic of FIG. 8 that is used as the basis for modifying the priority network to provide the modified priority network logic of FIG. 9 which allows the CPU to be placed next the memory on the bus. As shown in FIG. 9, the priority network of FIG. 8 has been modified such that the CPU will not even vie for the bus if another unit is requesting the bus. Thus, the CPU which is to be the lowest priority unit, wuill stay off the bus if any other unit, all of which are higher priority, is already requesting the use of the bus. Next, it has been recognized that there are very few times when the bus is not already being requested, that both the CPU and another unit will simultaneously make a bus request, and in those few cases in which such situation does arise, it is permissible to allow the CPU, which is to be the lowest priority unit, to win the bus over any other unit on the bus. These few times in which the CPU and another higher priority unit request the bus simultaneously are treated in the same manner in which the CPU requests the bus slightly ahead of the higher priority unit and therefore wins the bus. This results in the CPU winning the bus a little bit more than it would have if it was placed at the lowest priority end of the bus.

Bus requests are made by the CPU only when the CPU is ready to transmit or receive data to or from another unit connected to the bus. Again referring to FIG. 9, when the CPU wishes to access another unit on the bus, signal MYASKS— becomes a binary ZERO and sets user flip-flop 15M. The setting of user flip-flop 15M causes its Q output, signal MYASKQ+, to become a binary ONE. With signal MYASKQ+ a binary ONE at one input of AND gate 40M, when signal MYASKS— returns to the binary ONE state, the output of AND gate 40M, signal MYASKK+, will become a binary ONE and partially enable NAND gate 16M. In the preferred embodiment, AND gate 40M has been added because the clock speed is externally variable and affects the length of time in which signal MYASKS— is in the binary ZERO state. If signal MYASKS— remains in the binary ZERO state for longer than it takes a request cycle on the bus there is the possibility that signal MYASKS— could still be in the binary ZERO state after the CPU had requested the bus, had vied for the bus, and won the bus and wanted to reset user flip-flop 15M. Therefore, AND gate 40M prevents a request from being made before signal MYASKS— returns to the binary ONE state. AND gate 40M would not be necessary and the Q output of user flip-flop 15M would go directly into NAND gate 16M if the system is designed such that signal MYASKS— will, when setting user flip-flop 15M, be in the binary ZERO state for a time that is less than that required for the user to win the bus cycle.

The first major change between the priority network logic of FIG. 8 and the modified priority network logic of FIG. 9 appears in NAND gate 16M. NAND gate 16M, in addition to having the two input signals found in NAND gate 16 of FIG. 8, has two additional inputs. These two additional inputs provide for the modified priority network logic, in addition to making sure that the bus is not busy before user flip-flop 15M sets request flip-flop 17M, will also make sure that no other unit on the bus is requesting use of the bus. Two signals are required to examine the state of bus requests. The first signal is MBREQT—, which is output by inverter 41M the input to which is derived from signal BSREQT— from the bus itself after being inverted by receiver 11M. Thus, signal MBREQT— will be in the binary ONE state and partially enable NAND gate 16M when no other unit on the bus is making a bus request. However, signal BSREQT— is valid only during part of the time and therefore a strobing signal, which is signal BSDCNB—, is also an input into NAND gate 16M so that the bus request status will only be examined when signal BSREQT— is valid. Therefore, NAND gate 16M allows a user request which has set user flip-flop 15M to set request flip-flop 17M only when the bus is not busy and with the addition of these two additional signals, MBREQT— and BSDCNB—, only when no other unit on the bus is making a request. Therefore, when gate 16M is fully enabled by having four binary ONEs at its input, its output will become a binary ZERO and set request flip-flop 17M.

The second major change that was made in the priority network logic of FIG. 8 to produce the modified priority network of FIG. 9 involves the resetting of user flip-flop 15M. In the priority network logic of FIG. 8, user flip-flop 15 can be reset once request flip-flop 17 has been set. In the priority network logic of FIG. 8, user flip-flop 15 is reset when grant flip-flop 22 is set at the beginning of a grant cycle. In the priority logic of FIG. 8, the early resetting of user flip-flop 15 would not result in the user request being lost in the case in which the requesting unit vied for and was granted the bus, i.e., grant flip-flop 22 was set, but yet was waited by the responding unit. In the priority logic of FIG. 8, this case in which the requesting unit wins use of the bus but is then waited by the responding unit, is handled by the BSWAIT+ signal at the data (D) input of the request flip-flop 15 being clocked by signal MYREQR+ such that the request flip-flop 15 will once again be set when the requesting unit is waited by the responding unit and the request will be remade even though user flip-flop 15 has been reset.

However, this approach is inappropriate and would not work within the modified priority network logic in FIG. 9. If this same approach was followed in the modified priority logic of FIG. 9, in which a low priority can occupy a high priority position on the bus, it would result in the resetting of the request flip-flop 17M each time the low priority unit in the high priority slot was waited by the unit it wishes to communicate with. This could result in a deadly embrace because the low priority unit would have its request flip-flop set and therefore continue to vie for the bus and win (be granted) the bus over other higher priority units that are in lower priority positions along the bus. This would result in a deadlock because these higher priority units in the lower priority positions would not be able to win the bus over the low priority unit and therefore not clear the condition which was causing the responding unit to respond with a WAIT signal.

Therefore, to prevent this case in which once a request from the low priority unit in the high priority position was granted from remaining on the bus due to a WAIT response from the unit with which the requester is trying to communicate, the modified priority logic of FIG. 9 resets request flip-flop 17M each time the requesting unit is granted access to the bus by the setting of grant flip-flop 22M. Thus, when grant flip-flop 22M is set, signal MYDCNN+ at its Q output will partially enable AND gate 42M. AND gate 42M will become fully enabled when signal BSBSY— at the output of NOR gate 14M becomes a binary ONE causing the output of AND gate 42M, signal MYREQR+, to become a binary ONE and clock the binary ZERO at the data (D) input of request flip-flop 17M. This will reset request flip-flop 17M each time the requesting unit is granted access to the bus. Further, it will not result in the automatic setting again of request flip-flop 17M if the responding unit responds with a WAIT response. By not automatically setting again request flip-flop 17M, modified priority network logic in FIG. 9 allows higher priority units located in lower priority positions along the bus to vie for and win the bus and thereby remove the condition which caused the responding unit to respond with a WAIT response. It should be noted that when request flip-flop 17M is clocked by signal MYREQR+, the output of NAND gate 16M will be a binary ONE because signal BSDCNB— will have become a binary ZERO and disabled NAND gate 16M.

To handle this condition in which the low priority unit occupying a high priority position on the bus has vied for (requested) and been granted the bus and then received a WAIT response from the responding unit, the WAIT signal BSWAIT+ is clocked into the data (D) input of user flip-flop 15M by the Q output of flip-flop 37M, signal MYASKR+. Flip-flop 37M performs the same function in the modified priority network logic of FIG. 9 that is provides in the priority network logic of FIG. 8 in that in provides a clocking pulse to clock in the state of the WAIT response signal, which is signal BSWAIT+. The difference is that in the modified priority logic of FIG. 9, the WAIT response signal is clocked into user flip-flop 15M whereas in the priority network of FIG. 8, this signal is clocked into request flip-flop 17. In the modified priority network logic of FIG. 9, this clocking of the WAIT response signal into user flip-flop 15M will result in user flip-flop 15M being set again (actually, it simply remains set) if the responding unit was not able to accept the request from the requesting unit and will result in the resetting of user flip-flop 15M if the responding unit was able to accept the request and therefore the transmission between the bus requesting unit and the responding unit will be completed and need not be tried again.

In the modified priority network logic of FIG. 9, it is this unconditional resetting of request flip-flop 17M each time the requesting unit wins the bus and sets its grant flip-flop 22M followed by the conditional setting or resetting of user flip-flop 15M as a function of the response of the requested (responding) unit (i.e., whether the responding unit gives a WAIT response or not), allows the modified priority network logic to avoid a deadly embrace condition. That is, once the responding unit indicates that it cannot respond at this time to the requesting unit, the requesting unit must get off the bus. This is done by resetting request flip-flop 17M so that its Q output, which is coupled to the bus via driver 18M, and is therefore visible to all other units connected to the bus. In the modified priority network logic of FIG. 9, grant flip-flop 22M is reset by any response (ACK, NACK or WAIT) from the responding unit via NOR gate 21M in the same manner as is grant flip-flop 22 in the priority network logic of FIG. 8. Thus, using the modified priority network logic, if the user request flip-flop 17M is reset each time the requesting unit is granted a bus cycle, irrespective of the response from the responding unit, and the user flip-flop 15M remains set if the responding unit responds with a WAIT response and is reset if the unit responds with an ACK or NACK response. This results in the requesting unit getting off the bus (i.e., removing its request) each time the requesting unit wins the bus cycle and results in the user request remaining set if the responding unit responds with a WAIT response. By getting off the bus and re-vying for the bus, if waited by the responding unit, the requesting unit, which is a lower priority unit, allows other higher priority units, which are in physically lower priority positions along the bus, to win the bus and remove the condition which caused the responding unit to respond with the WAIT response.

If the requesting unit was waited by the responding unit sending a WAIT signal, the user flip-flop 15M remains set and will result in the resetting of request flip-flop 17M if no other unit is requesting use of the bus as described above. However, in this case, where the requesting unit has just been waited, signal BSDCNB— into NAND gate 16M will not be a binary ONE until after the time of delay 25 (about 60 nanoseconds in the preferred embodiment) thus assuring that other units will have an opportunity to request the bus before the waited unit tries again. When the bus has not been busy, this delay does not occur and the setting of the user flip-flop 15M will result in the immediate setting of request flip-flop 17M.

Both user flip-flop 15M and request flip-flop 17M can also be reset by the occurrence of a bus master clear which will cause signal BSMCLR— to become a binary ZERO at their reset (R) inputs. This is similar to the priority network of FIG. 8 in which user flip-flop 15 and request flip-flop 17 are reset by signal BSMCLR+ (as inverted by NOR gate 29) and signal MYMCLR— respectively. A gate corresponding to NOR gate 29 of FIG. 8 does not appear in the modified priority network logic of FIG. 9 because user flip-flop 15M is not unconditionally reset each time that the unit wins the bus cycle and therefore the signal MYDCNN+ from grant flip-flop 22M is not used to also reset user flip-flop 15M.

From the above discussion it can be appreciated that the signals BSREQT— and BSDCNN— run in parallel to all units on bus 200 and it is these signals that are used to determine whether or not the unit using the modified priority network logic will or will not vie for use of the common bus. The states of the information on these lines is not always valid and therefore may only be looked at at certain times as determined by the strobe signals.

In any one bus request cycle, the priority among all competing units is determined by the staggered nine signals, BSAUOK+ through BSIUOK+, which are daisy-chained from unit to unit along the bus. It is this set of nine signals that make the various units along the bus dependent upon their physical position on the bus with respect to priority such that of all the units vying for the bus, the unit closest to the high priority physical end of the bus will win the bus over all other units toward the low priority physical end of the bus.

Although the above discussion has been in terms of the CPU being placed next to the memory by use of the modified priority network logic of FIG. 9, the modified priority network logic could be used by any unit which was desired to be the lowest priority unit on the bus. That lowest priority unit could be placed in any physical position along the bus, including the highest priority physical position, if delay 28M is provided for as discussed above with respect to delay 28 in FIG. 8. The reason that the modified priority network logic allows the lowest priority device to be placed in any physical position along the bus is that the modification to the logic required that no other unit on the bus be making a request at the time the lowest priority unit initiates a request for a bus cycle.

Although the above discussion has been in terms of providing one unit on the bus with the modified priority network logic, in fact, it is possible to have multiple units on the bus using the modified priority network logic. For example, in a system in which multiple CPUs are present, it may be desirable to group all of the CPUs immediately adjacent to the memory on the bus. In this case, if multiple units use the modified priority network logic of FIG. 9, all units using the modified priority network logic will be of lower priority that all units using the un-modified priority network logic of FIG. 8 because all of the unit using the modified priority network logic will look at the bus request signal before they vie for use of the bus. In this case, if multiple units using the modified priority network logic make simultaneous bus requests, the priority among the modified priority network units will be determined by their physical position along the bus because once they do make a request, the priority is determined by the daisy-chain effect of signals BSAUOK+ through BSIUOK+ which are input into NAND gate 19M. Thus, among those units having the modified priority network logic, the unit closest to the high priority physical end of the bus will have the highest priority and the unit closest to the low priority physical end of the bus will have the lowest priority and intermediate units will have intermediate priorities.

Although the preferred embodiment has been described primarily in terms of mixing one or more units having the modified priority network logic of FIG. 9 with units having the un-modified priority network logic of FIG. 8, it is equally applicable if all units have the modified priority network logic of FIG. 9 except that in this case the priority determination reverts back to a system where priority of all units is determined by their physical position along the bus.

While the invention has been shown and described with reference to the preferred embodiment thereof, it will be understood by those skilled in the art that the above and other changes in form and detail may be made therein without departing from the spirit and scope of the invention.

What is claimed is:

1. In a data processing system having a plurality of units coupled to transfer information over a bus, each of said units capable of transferring information, a distributed priority network wherein priority is normally determined by physical position on said bus, said network including priority logic in each of said units and wherein said priority logic of at least one of said plurality of units is a modified priority logic, said modified priority logic comprising:

(A) first bistable means of a modified unit of said plurality of units for asynchronously indicating that said modified unit is ready to transfer information over said bus to a receiving unit of said plurality of units;

(B) second bistable means of said modified unit, responsive to said first bistable means indicating that said modified unit is ready to transfer information over said bus, for generating a first signal on said bus indicating to each of said plurality of units that at least one of said plurality of units is requesting use of said bus to transfer information over said bus to another unit of said plurality of units;

(C) means of said modified unit, responsive to the absence of said first signal on said bus the absence of which indicates that no other unit of said plurality of units is requesting use of said bus, for enabling said indication from said first bistable means that said modified unit is ready to transfer information over said bus to be transmitted to said second bistable means;

(D) means of said modified unit, responsive to the absence of said first signal from said second bistable means in each of said plurality of units having a higher priority physical position on said bus than said modified unit for indicating that said modified unit is the highest priority unit requesting use of said bus;

(E) third bistable means of said modified unit, responsive to said first signal generated by said second bistable means and an indication that no other unit of said plurality of units having a higher priority is requesting use of said bus, for generating a second signal on said bus;

(F) means in each of said plurality of units, responsive to the receipt of said second signal from said bus, for generating a strobe signal within each of said plurality of units for enabling the receipt of information transferred from said modified unit;

(G) first means of said modified unit, responsive to an acknowledgement that said information has been received by said receiving unit, for disabling said third bistable means of said modified unit;

(H) second means of said modified unit, responsive to the disabling of said third bistable means, for unconditionally disabling said second bistable means of said modified unit; and (I) third means of said modified unit, responsive to the disabling of said third bistable means, for disabling said first bistable means if said modified unit did not receive an acknowledgement indicating the transfer of information over said bus should be retried, and whereby said modified unit having said modified priority logic, regardless of physical position on said bus, is of lower priority than all other units of said plurality of units coupled to said bus.

2. Logic as in claim 1 wherein said acknowledgement from said receiving unit may include a first acknowledgement signal indicating that said information has been accepted; a second acknowledgement signal indicating that said information has not been accepted; or a third acknowledgement signal indicating that said information has not been accepted but that said information would probably be accepted if transferred again; and wherein said first means for disabling is responsive to either said first, second or third acknowledgement signal; and wherein said logic further comprises means of said modified unit, coupled with said third means for disabling, for inhibiting the disabling of said first bistable means if said third acknowledgement signal is received by said modified unit.

3. Logic as in claim 2 further comprising means of said modified unit, responsive to said strobe signal, for enabling said third means for disabling.

4. Logic as in claim 3 wherein said third means for disabling is a fourth bistable means and wherein said third acknowledgement signal is coupled for receipt by first bistable means in response to the enabling of said fourth bistable means.

5. Logic as in claim 4 further comprising:

(A) gate means of said modified unit coupled to provide said indication that no other unit of said plurality of units having a higher priority is requesting use of said bus; and (B) a coupling of said modified unit between said second bistable means and said gate means, said coupling including:
  (1) a direct connection for said priority logic in each of said plurality of units except a high end unit in the highest priority physical position on said bus, and
  (2) a delay element for said high end unit to delay said first signal for the purpose of inhibiting said high end unit from gaining access to said bus while another unit of said plurality of units may still be transferring information over said bus.

6. Logic as in claim 5 further comprising means of said modified unit coupled with said gate means for inhibiting said modified unit from using said bus even though said modified unit is the highest priority unit requesting use of said bus.

7. Logic as in claim 1 further comprising:

(A) gate means of said modified unit coupled to provide said indication that no other unit of said plurality of units having a higher priority is requesting use of said bus; and (B) a coupling of said modified unit between said second bistable means and said gate means, said coupling including:
  (1) a direct connection for said priority logic in each of said plurality of units except a high end unit in the highest priority physical position on said bus, and
  (2) a delay element for said high end unit to delay said first signal for the purpose of inhibiting said said high unit from gaining access to said bus while another unit of said plurality of units may still be transferring information over said bus.

8. Logic as in claim 1 further comprising means of said modified unit coupled with said third bistable means for inhibiting said modified unit from using said bus even though said modified unit is the highest priority unit requesting use of said bus.

9. Logic as in claim 1 further comprising means responsive to the absence of said strobe signal, for disabling said means for enabling said indication from said first bistable means until said strobe signal occurs.

10. A data processing system having a priority determining system comprising:

(A) a plurality of units, said units including a memory, a data processor, and at least one peripheral device controller, each of said units having a different priority and each of said units capable of transferring information;

(B) a common bus, coupled with each of said units, for providing a path for the asynchronous transfer of said information between any two of said units, said bus having first and second ends, the one of said units coupled closest to said first end normally having the highest priority, and the one of said units coupled closest to said second end normally having the lowest priority, and the other ones of said units normally having a priority relative to their proximity to said first and second ends;

(C) a priority network included in at least one of said units wherein priority is determined only as the basis of physical position on said bus; and (D) a modified priority network included in at least one of said units comprising:
  (1) first means for asynchronously generating a first signal indicating that a requesting one of said units is ready to transfer information over said bus to another one of said units,
  (2) second means, responsive to said first signal, for indicating on said bus by the generation of a second signal, that said requesting unit is ready to transfer information over said bus to another one of said units,
  (3) third means, responsive to said second signal from said second means for indicating in each of said units, for indicating whether any unit in a physical higher priority position than said requesting unit is also requesting to transfer information over said bus,
  (4) first logic means, coupled with said second and third means for indicating and responsive to said second signal, for generating a third signal if no other said unit in a physical higher priority position is also requesting to transfer information over said bus as indicated by said third means for indicating, (5) fourth means, responsive to said third signal, for generating a fourth signal on said bus indicating that said requesting unit is the only one of said units presently allowed to so transfer information over said bus, (6) second logic means, responsive to said fourth signal for inhibiting any other said units for transferring information over said bus while said requesting unit is transferring information over said bus, (7) a first logic element responsive to an acknowledgement that said information has been received, for disabling said fourth means for generating of the unit which has transferred information over said bus, and (8) a third logic element, responsive to the disabling of said fourth means for generating, for unconditionally disabling said second means for indicating of said unit which has transferred information over said bus, (9) a second logic element, responsive to the disabling of said fourth means for generating, for disabling said first means for indicating of said unit which has transferred information over said bus if said unit which has transferred information over said bus did not receive an acknowledgement indicating the transfer of information over said bus should be retried, and whereby said unit having said modified priority logic, regardless of physical position on said bus, is of lower priority than all other units of said plurality of units that have said priority logic.

11. Logic as in claim 10 wherein said acknowledgement includes either a first acknowledgement signal indicating that said information has been accepted; a second acknowledgement signal indicating that said information has not been accepted, or a third acknowledgement signal indicating that said information has not been accepted but that said information would probably be accepted if transferred again; and wherein said first logic element for disabling is responsive to either said first, second or third acknowledgement signal; and wherein said logic further comprises means, coupled with said second logic element for disabling, for inhibiting the disabling of said first means for indicating if said third acknowledgement signal is received by said requesting unit.

12. A system as in claim 11 further comprising means, in each of said units and responsive to said fourth signal, for generating a strobe signal for enabling the transfer of information over said bus from said unit generating said fourth signal.

13. Logic as in claim 12 further comprising means, responsive to said strobe signal, for enabling said second logic element for disabling.

14. Logic as in claim 13 wherein said second logic element for disabling is a fourth bistable means, and wherein said third acknowledgement signal is coupled for receipt by said first means in response to the enabling of said fourth bistable means.

15. Logic as in claim 13 further comprising means responsive to said strobe signal, for enabling said second means to respond to said first signal.

16. A method of resolving priority within a system between a plurality of units coupled to transfer information over a common bus, wherein each of said plurality of units is capable of transferring information over said bus, and wherein priority is normally determined by physical position on said bus, said method comprises the steps of:

(A) asynchronously setting a first bistable means to indicate that a requesting unit of said plurality of units is ready to transfer information over said bus to a receiving unit of said plurality of units;

(B) setting a second bistable means in response to the setting of said first bistable means if no other units of said plurality of units is requesting use of said bus as determinned by the absence of a first signal on the bus;

(C) generating said first signal on said bus indicating that said requesting unit is ready to transfer information over said bus in response to the setting of said second bistable means;

(D) determining that no other unit of said plurality of units located in a higher priority physical position on said bus is requesting use of said bus by the absence of said first signal being generated by any unit of said plurality of units located in a higher priority physical position on said bus;

(E) setting a third bistable means in response to the setting of said second bistable means if it is determined that no unit in a higher priority position is requesting use of said bus;

(F) generating a second signal on said bus in response to setting said third bistable means;

(G) generating a strobe signal for enabling receipt of information by each of said plurality of units from said requesting unit;

(H) disabling said third bistable means in response to an acknowledgement from said receiving unit that the information has been received;

(I) disabling said second bistable means of said requesting unit unconditionally in response to the disabling of said third bistable means;

(J) disabling said first bistable means of said requesting unit if said requesting unit did not receive an acknowledgement indicating the transfer of information over said bus should be retried; and (K) returning to step B if said requesting unit received said acknowledgement indicating that the transfer of information over said bus should be retried;

and whereby said requesting unit using said method is of lower priority, regardless of physical position on said bus, than any other unit of said plurality of units that has priority determined on the basis of physical position alone.

17. The method of claim 16 wherein said step B of setting said second bistable means is performed only if said strobe signal of step G is present.

* * * * *